Jan. 20, 1925.
L. R. BUELL
GREASE CUP
Filed Feb. 23, 1923
1,523,513
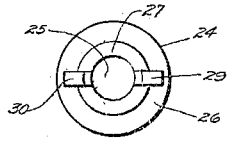
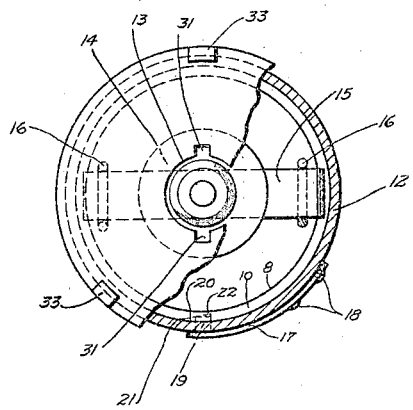
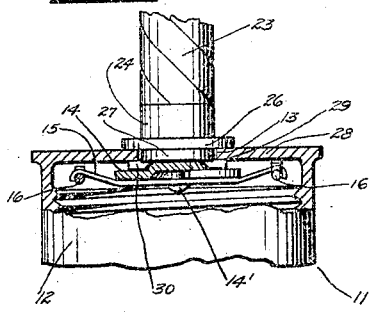
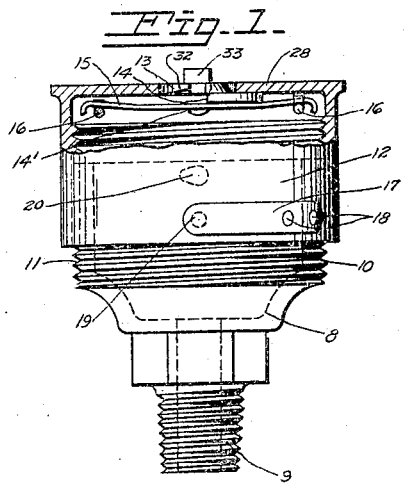
INVENTOR.
Lawrence R. Buell.
BY
Morsell, Keeney & Morsell
ATTORNEYS Patented Jan. 20, 1925.

1,523,513

UNITED STATES PATENT OFFICE.

LAWRENCE R. BUELL, OF LAKE GENEVA, WISCONSIN.

GREASE CUP.

Application filed February 23, 1923. Serial No. 620,770.

*To all whom it may concern:*

Be it known that I, LAWRENCE R. BUELL, a citizen of the United States, and resident of Lake Geneva, in the county of Walworth and State of Wisconsin, have invented new and useful Improvements in Grease Cups, of which the following is a description, reference being had to the accompanying drawings, which are a part of this specification.

This invention relates to improvements in grease cups, and more particularly to grease cups for use on agricultural machinery, and heavy vehicles.

The ordinary form of grease cup consists of a stem and a barrel screwed upon the stem, which barrel serves as a grease reservoir and stores the lubricant in a position where the bearings will not get the benefit of the same.

It is therefore, one of the objects of the present invention to provide a grease cup which will meet the lubricant requirements of tractors, automobiles, agricultural machinery, etc., and which will direct the lubricant contained therein directly to the bearings.

A further object of the invention is to provide a grease cup which will eliminate the necessity of removing any of the parts when re-filling.

A further object of the invention is to provide a grease cup in which the cap cannot become accidentally removed or unthreaded from the grease cup proper, but, when desired, the cap can be released so as to be entirely unthreaded and removed.

A further object of the invention is to provide means by which a force filler may be anchored to the grease cup so that in filling, no lubricant is lost as it passes from the force filler into the cup.

A further object of the invention is to provide a grease cup which will store the lubricant after the bearings have been filled so that when the bearings again require lubricant, a turning of the cap of the grease cup will force grease into the bearings.

A further object of the invention is to provide an improved grease cup which is of very simple construction, is inexpensive to manufacture, is strong and durable, and is well adapted for the purposes described.

With the above and other objects in view, the invention consists of the improved grease cup, and its parts and combinations as set forth in the claim and all equivalents thereof.

In the accompanying drawing in which the same reference characters indicate the same parts in all of the views:

Fig. 1 is a side view of the improved grease cup, parts being shown in section;

Fig. 2 is a top view thereof, part being broken away and shown in section;

Fig. 3 is a fragmentary view of the grease cup showing a force filler anchored thereto, part being shown in section; and Fig. 4 is a bottom view of the attachment for the force filler.

Referring now more particularly to the drawing, the numeral 8 indicates a grease cup proper having the threaded tubular stem portion 9 which is fitted into the bearings (not shown). The portion 10 of the grease cup is enlarged to form a barrel or reservoir for storing the lubricant and its outer surface is threaded as at 11. A cap or cover member 12 is provided to be threaded onto the barrel portion 10. Centrally disposed in the top portion of the cap is a circular aperture 13 for the reception of a lubricant into the grease cup, and said aperture is normally closed by means of a disc 14 positioned directly below said aperture on the underside of the cap. Said disc has its mid-portion raised so as to be within aperture 13. An elongated flat spring 15, removably supported to the underside of the cap by a pair of downwardly projecting and oppositely disposed L-shaped hooks 16, yieldingly holds the disc in place adjacent the aperture 13 and said disc is secured to the spring by a pin 14'. To remove said spring, it is merely necessary to give it a slight turn so as to swing it clear of the hooks 16.

In injecting a lubricant into the grease cup, it is desirable that the cap be unthreaded so that the capacity of the barrel of the cup will be enlarged and so that at some later time, the cap can be turned downwardly to force grease stored in the barrel into the bearings. However, it is also desirable that the cap is not removed from the barrel because the threads are apt to become filled with grease and it is very difficult and troublesome to put the cap back onto the barrel. Hence, with the above in view, i. e., to permit the unthreading of the cap to increase the capacity of the barrel and to prevent the accidental, entire removal of the cap, a lock means for the cap is provided. Said means consists of a flat spring 17 secured to the outer surface of the cap, comparatively close to its edge, and at one end only, as at 18. An inwardly projecting stud 19 is carried by the free end of said spring and said stud extends through an opening in the cap as shown in Fig. 2. Between some of the upper threads 11 on the barrel 10, a small depression 20 is formed which has an inclined side 21 and the other side 22 perpendicular. Thus, in threading the cap onto the barrel the stud 19 will ride over the incline 21 of the depression. But, in unthreading the cap, when the stud reaches the depression it will meet the shoulder 22 thereof and the cap will be locked against any further unthreading. Should it be desired, however, to entirely remove the cap from the barrel, the flexibility of spring 17 will permit its being lifted outwardly to disengage the shoulder.

In Figs. 3 and 4 an additional part of the device is illustrated, i. e. an anchoring member for a force filler. The numeral 23 represents a tubular member connected with a force filler for lubricant (not shown). The free end of said tubular member has formed thereon the metallic anchoring member 24 provided with an opening 25 which is in alignment with the interior of the tubular member. Formed near the outer end portion of the member 24 is an annular flange 26 and projecting therefrom is the aperture engaging portion 27 which is of such a diameter as to allow it to fit tightly into the aperture 13 in the top of the grease cup cap. The depth of said portion 27 is approximately equal to the thickness of the top 28 of the grease cup cap. Flanges 29 and 30 project outwardly and radially from the portion 27. In Fig. 3, the anchoring member 24 is shown in connection with the grease cup and ready to permit lubricant to be forced therethrough and into the grease cup and bearings. To effect said attachment or anchoring, member 24 is positioned adjacent the outer face of the top of the grease cup cap. A pair of spaced slots 31 communicating with the aperture 13 are provided in the top of the cap and said slots receive the flanges 29 and 30 so that the portion 27 of member 24 will be within the aperture and the annular flange 26 will bear against the top of the cap. To lock the anchoring member 24 into the grease cup it is given a slight turn so that the flanges will be moved away from the slots 31. The metal around the aperture 13 is of a slightly less breadth adjacent the slots as at 32, so that when member 24 is turned, it will be wedged tightly in position and lubricant cannot leak through the joint. As shown in Fig. 3, when the anchoring member is inserted in place, the disc 14 will be forced away from the aperture by flanges 29 and 30 to permit lubricant to flow through the aperture into the barrel 10 and to the bearings. When the anchoring member is removed from the aperture, the spring 15 will automatically force the disc back adjacent the aperture to close it. Spaced upstanding projections 33 are formed on the upper periphery of the cap to permit the insertion of a flat tool or rod therebetween to gain leverage when it is needed to turn the grease cup.

From the foregoing description, it will be seen that the improved grease cup is of very simple construction, and is well adapted for the purpose described.

What I claim as my invention is:

A grease cup, comprising a member having a reservoir portion and a stem, a cap secured to said reservoir portion, a central aperture in the top of said cap, a disc valve within said cap adjacent said aperture, a flat spring supporting said disc and normally holding it adjacent said aperture, and oppositely disposed hooks for removably holding said spring to the interior of the cap in a yieldable position.

In testimony whereof, I affix my signature.

LAWRENCE R. BUELL.